United States Patent [19]

Yoo

[11] Patent Number: 5,223,679
[45] Date of Patent: Jun. 29, 1993

[54] ELEVATOR DRIVE MOTOR TO ENCODER CONNECTION HAVING A FLEXIBLE ROD AND A BELLOWS COUPLING

[75] Inventor: Young Yoo, Avon, Conn.

[73] Assignee: Otis Elevator Company, Farmington, Conn.

[21] Appl. No.: 588,239

[22] Filed: Sep. 26, 1990

[51] Int. Cl.⁵ .......................... B66B 3/02; F16D 3/10
[52] U.S. Cl. ..................... 187/134; 187/17; 464/79; 464/92
[58] Field of Search ............... 187/117, 136, 134, 17; 318/602; 73/151.5; 33/772; 464/79, 80, 180, 181, 92; 74/10 R

[56] References Cited

U.S. PATENT DOCUMENTS

| | | | |
|---|---|---|---|
| 2,658,361 | 11/1953 | Kalikow | 464/180 |
| 2,889,695 | 6/1959 | Moeller | 464/181 |
| 3,590,355 | 6/1971 | Davis et al. | 187/136 |
| 4,232,756 | 11/1980 | Bathelt | 464/79 |
| 4,527,440 | 7/1985 | Heitman et al. | 74/10 R |
| 4,758,204 | 7/1988 | Lindgren | 464/181 |
| 4,881,922 | 11/1989 | Ayers | 464/79 |
| 4,971,178 | 11/1990 | Schauder et al. | 187/117 |
| 5,093,610 | 3/1992 | Bailey | 318/661 |

Primary Examiner—Steven L. Stephan
Assistant Examiner—Robert Nappi
Attorney, Agent, or Firm—William W. Jones

[57] ABSTRACT

An encoder is connected to an elevator traction machine shaft for sensing rotation of the machine shaft. The connector assembly includes a flexible torque-transmitting rod to minimize lateral deflection forces imparted to the encoder shaft by reason of misalignment between the machine and encoder shafts. A flexible collar is used to interconnect the flexible torque-transmitting rod with the encoder shaft.

4 Claims, 3 Drawing Sheets

ELEVATOR DRIVE MOTOR TO ENCODER CONNECTION HAVING A FLEXIBLE ROD AND A BELLOWS COUPLING

TECHNICAL FIELD

This invention relates to an improved connection assembly for use in interconnecting an encoder shaft and an elevator traction machine shaft, and more particularly to a connection assembly operable to minimize stresses imparted to the encoder shaft during operation.

BACKGROUND ART

Modern elevators utilize sophisticated software in controllers which control most aspects of the elevator's operation. The controllers gather information from various sources in the elevator system and use that information to efficiently operate the elevator. Thus elevator speed, starting, stopping, dispatching, floor positioning or leveling, and the like are all governed by the controller. In performing its functions, a most important input for the controller software is the speed and location of the car. Modern elevators generally use tapes secured to the car and journaled in the machine room and pit which move about pulleys as the car ascends and descends in the hoistway. The tapes are monitored by a sensor to detect car speed and position.

In view of the efficiency and accuracy of modern software-controlled elevators, there is a substantial demand for modernization of older elevators so that they can also be controlled and operated by appropriate software. In order to accomplish this modernization, the selector assembly on the older elevators must be replaced with a sensing device which can interact with the new controller microprocessor. One solution to the problem of replacing the prior art selector assemblies is to connect a sensor or monitor to the shaft of the electric motor which drives the traction sheave on the elevator. The monitor of choice is an encoder which measures motor shaft revolutions and translates the results into machine readable signals delivered to the controller microprocessor. The encoder operates by having a rotatable encoder shaft connected to the motor shaft so as to rotate conjointly therewith. The number, direction, and speed of encoder shaft rotations thus indicates the direction of movement, speed and position of the elevator car. Use of the encoders to monitor motor shaft rotation requires very accurate alignment of the axes of the encoder shaft and the motor shaft. Misalignment of these shafts often results in damaged couplings, and in damage to the encoder bearings which are relatively delicate. Poor car motion control can also occur with shaft misalignment.

Improved alignment can be accomplished through tight tolerances on the ports using pilot surfaces of the existing motor shaft O.D. and motor shaft beam housing I.D. This solution, however, can be expensive, and requires great care in installation. Springy flexible collar-type couplings can be attached to the ends of the respective shafts to provide some margin for coaxial misalignment, however, their annular shape limits their utility in combating damage or shortened useful life in cases of shaft misalignment.

DISCLOSURE OF THE INVENTION

This invention relates to a shaft connection assembly which includes a torque transmitting laterally flexible rod which has a small diameter. Preferably, the flexible rod will be used in conjunction with the flexible collar. In such a case, the lateral flexure resulting from any misalignment will occur in the flexible rod rather than the flexible collar. Since the rod has a negligible mass, minimum stress will be imposed on the encoder bearings by minor axial misalignment between the motor shaft and the encoder shaft. The flexible rod is also preferably axially adjustable to compensate for differences in distance between the motor shaft and encoder shaft.

It is therefore an object of this invention to provide an improved connection between an elevator motor shaft and an encoder shaft whereby the encoder can detect information relating to rotation of the motor shaft.

It is a further object of this invention to provide an improved connection of the character described which relaxes to some degree the criticality of shaft alignment.

It is another object of this invention to provide an improved connection of the character described which minimizes stress imposed on the encoder shaft bearings resulting from shaft misalignment.

It is an additional object of this invention to provide an improved connection of the character described which has a high degree of lateral flexibility.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 1:
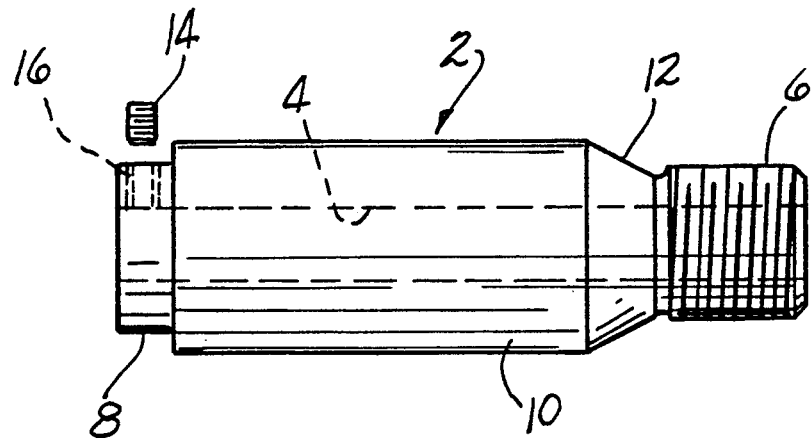
FIG. 1 is a side elevational view of a holder sleeve component of the flexible rod connector.
Figure 2:
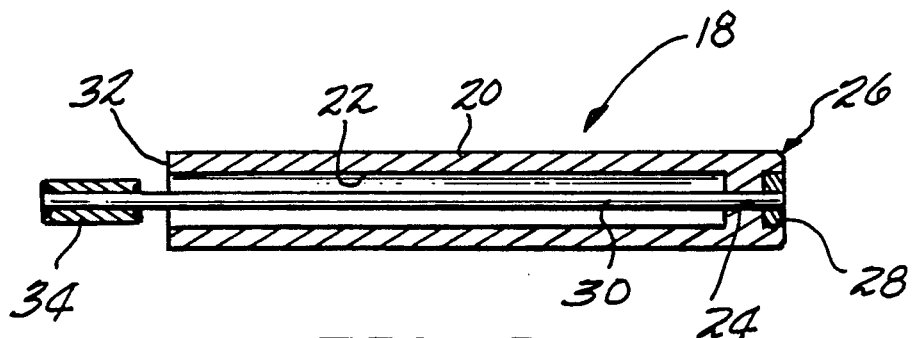
FIG. 2 is an axial sectional view of the flexible rod insert which is fitted into the sleeve shown in FIG. 1.

Referring to FIG. 1, there is shown a sleeve part 2 of a preferred two-piece embodiment of the flexible shaft connector of this invention. The sleeve 2 has a through bore 4, an externally threaded end 6, and a wrench engaging boss 8 at the opposite end. The boss 8 is provided with diametrically opposed flats which are engageable by a wrench for assembling the connection, as will become clear hereinafter. The sleeve 2 includes a medially enlarged portion 10, and a centering chamfered surface 12 adjacent to the threaded end 6. Three set screws 14 are disposed in equispaced threaded bores 16 in the boss 8. FIG. 2 shows details of the flexible rod extension insert 18 which fits into the sleeve 2. The insert 18 has a cylindrical outer part 20 having a blind bore 22 therein. A small hole 24 extends from the blind bore 22 through an end 26 of the insert 18. A counter bore 28 is formed in the end 26 opposite the blind bore 22. The flexible rod 30 is disposed in the blind bore 22 and is secured in the hole 24 by solder disposed in the counterbore 28. The rod 30 projects beyond the end 32 of the insert 18 and carries a flange 34 at its outer end. The rod 30 can be spring steel or it can be formed of another material such as nylon, for example. The diameter of the rod 30 can be in the range of about 0.062" for steel to about 0.14" for nylon. The particular diameter is chosen so as to ensure adequate torque transmission along with sufficient lateral flexibility to minimize bearing stress.

Figure 3:
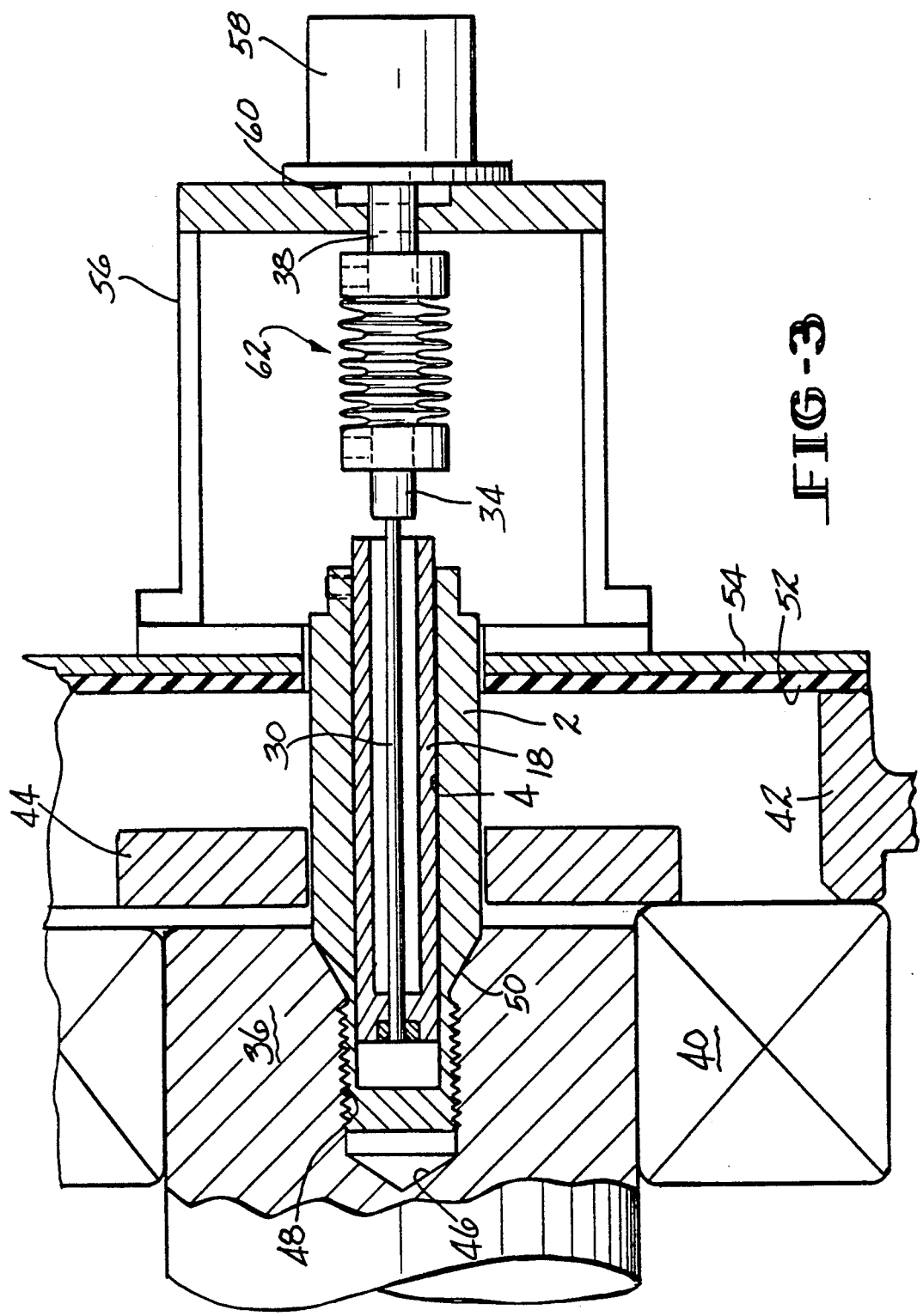
FIG. 3 is a fragmented sectional view of the connector assembly shown interconnecting the motor shaft the encoder shaft.
Figure 4:
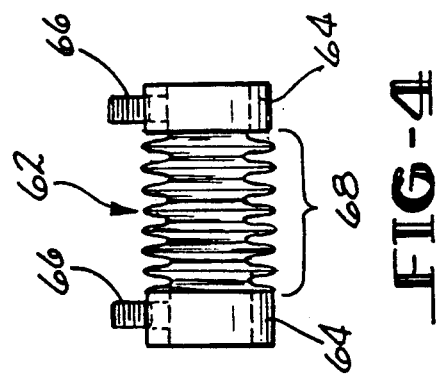
FIG. 4 is a side elevational view of the flexible portion of the connector assembly.

FIG. 3 shows the completed connection between the motor and the encoder. The motor shaft is designated by the numeral 36 and the encoder shaft is designated by the numeral 38. The motor shaft is journaled in a split bearing 40 which is mounted in the motor housing. An outer plate 42 holds the outer bearing race in place and an inner plate 44 holds the inner bearing race in place. The motor shaft 36 has a drilled and tapped axial bore 46 which has a threaded portion 48, and a conical portion 50. The connector sleeve 2 is screwed into the bore 46, and the shaft extension insert 18 is positioned in the sleeve bore 4. The flexible rod 30 thus projects beyond the motor shaft 36. A gasket 52 overlies the outer plate 42 and is covered by a cover plate 54 which is bolted to the outer plate 42. A bracket 56 is secured to the cover plate 54 and serves as a mount stand for the encoder 58. The encoder shaft 38 extends through an opening 60 in the bracket 56. It will be noted that the insert 18, and thus the flexible rod 30, can be axially moved in the sleeve bore 4 toward or away from the encoder shaft 38. Thus the flexible rod flange 34 can be properly offset from the encoder shaft 38 so as to allow use of a bellows type flexible collar 62 to interconnect the encoder shaft 38 and the flange 34. Details of the flexible collar 62 are shown in FIG. 4. The collar 62 has a pair of annular end rings 64 provided with locking set screws 66. The medial portion 68 of the collar 62 takes the form of bellows so as to provide flexibility to the collar 62 radially and axially. The shaft 38 is inserted into one of the rings 64 and the flange 34 is inserted into the other of the rings 64, and the set screws 66 are used to tighten the collar 62 in place. It will be appreciated that the flexible rod 30 can accommodate some misalignment between the axes of the shafts 36 and 38 by laterally bending. The light mass of the rod 30 does not impose harmful stresses on the bearings of the encoder shaft 38 when the rod 30 is bent. On the other hand, the rod 30 is sufficiently torsionally stiff to transmit rotational torque from the motor shaft 36 to the encoder shaft 38.

Figure 5:
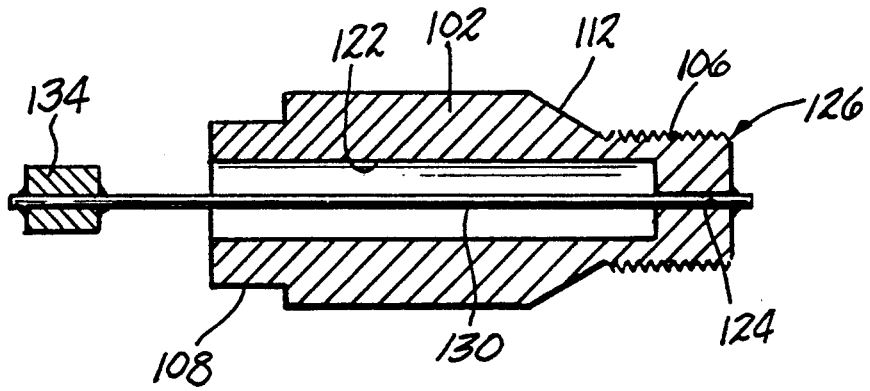
FIG. 5 is an axial sectional view of a one-piece embodiment of the flexible rod connector.
Figure 6:
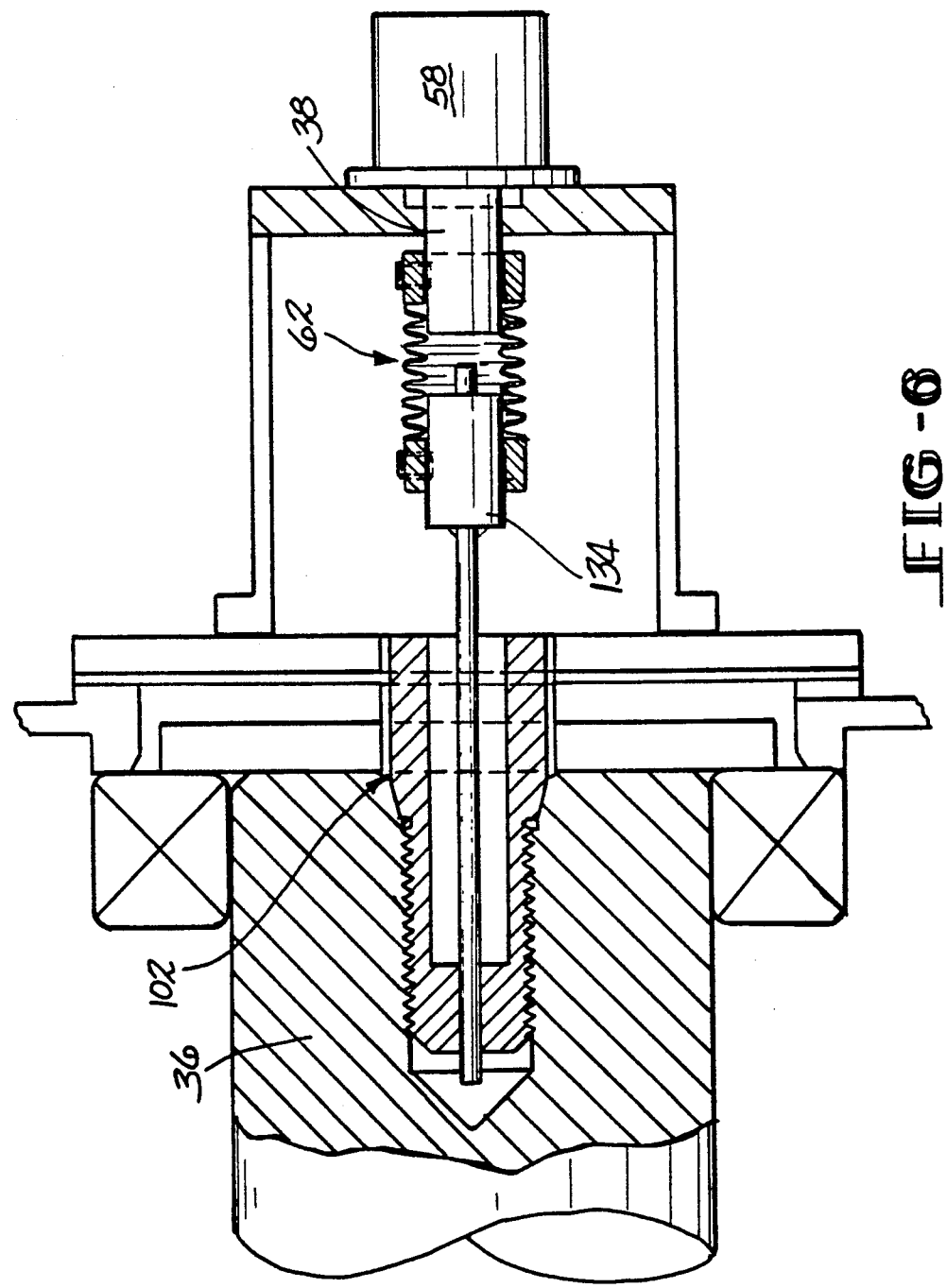
FIG. 6 is a view similar to FIG. 3 but showing the connector of FIG. 5 in place.

Referring to FIG. 5, an embodiment of the connector which is not longitudinally adjustable is shown. The connector 102 has a threaded end 106, a chamfered centering surface 112, and a wrench-engaging boss 108. A blind bore 122 is formed in the connector 102, and a through passage 124 is drilled in the end 126 of the connector 102. The flexible rod 130 is secured in passage 124 and extends outwardly of the blind bore 122. The enlarged flange 134 is mounted on the free end of the rod 130. As seen in FIG. 6, the connector 102 is mounted on the motor shaft 36 as previously described, and the collar 62 is used to connect the flange 134 to the encoder shaft 38.

It will be readily appreciated that the shaft connector of this invention provides a large measure of flexure which does not impart harmful stress to the shaft bearings of the encoder. The connector can also be produced in a form which provides for axial or longitudinal adjustment to accommodate different gap distances between the shafts being connected. Thus same components can be used for different size machines.

Since many changes and variations of the disclosed embodiments of the invention may be made without departing from the inventive concept, it is not intended to limit the invention otherwise than as required by the appended claims.

What is claimed is:

1. In an elevator system, an elevator car position monitor assembly comprising:
   a) an elevator motor having a casing and an output motive shaft disposed in said casing, said shaft having one end thereof disposed adjacent to said casing, said end of said shaft being provided with a drilled, tapped bore therein;
   b) a cylindrical sleeve having an externally threaded end thereof threaded into said shaft bore, said sleeve extending from said end of said shaft and projecting through an open in said casing, and said sleeve being provided with an axial blind bore which forms an opening through the end of said sleeve opposite said threaded end thereof;
   c) an encoder disposed externally of said housing, said encoder having a rotatable shaft which is generally coaxial with said motive shaft of said motor;
   d) a thin flexible but torsionally stable rod mounted in said blind bore of said sleeve, said rod projecting from said sleeve opening toward said encoder shaft; and
   e) flexible coupling means interconnecting said rod and said encoder shaft, said rod and said flexible means being operable to prevent excessive stresses being imposed on encoder shaft bearing in said encoder, which stresses arise from misalignment of said motor shaft and said encoder shaft.

2. The car position monitor assembly of claim 1 wherein said rod is contained in a cylindrical insert telescoped into said sleeve bore, said insert being axially slidable in said sleeve bore for adjustment of said rod relative to said encoder shaft; and securement means for fastening said insert in said sleeve bore.

3. The car position monitor assembly of claim 1 wherein said flexible coupling means is a bellows-type coupling.

4. The car position monitor assembly of claim 3 wherein said rod includes an enlarged flange at one end thereof to facilitate securement thereof to said bellows-type coupling.

* * * * *